July 13, 1937.  C. J. ANDERSON, JR  2,086,889
POWER TRANSMISSION
Original Filed July 6, 1932   5 Sheets-Sheet 1
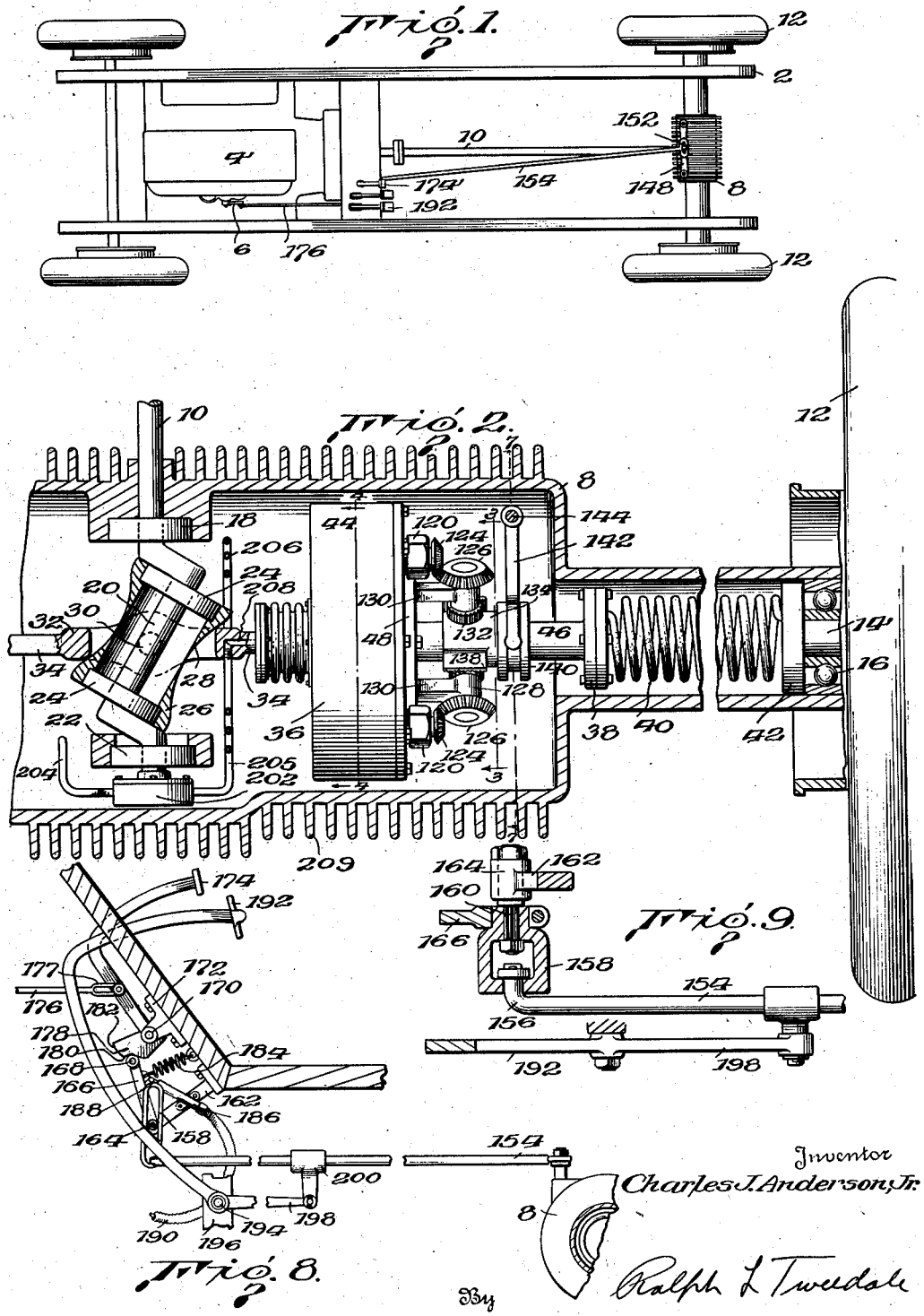
Inventor
Charles J. Anderson, Jr.
By Ralph L. Tweedale
Attorney

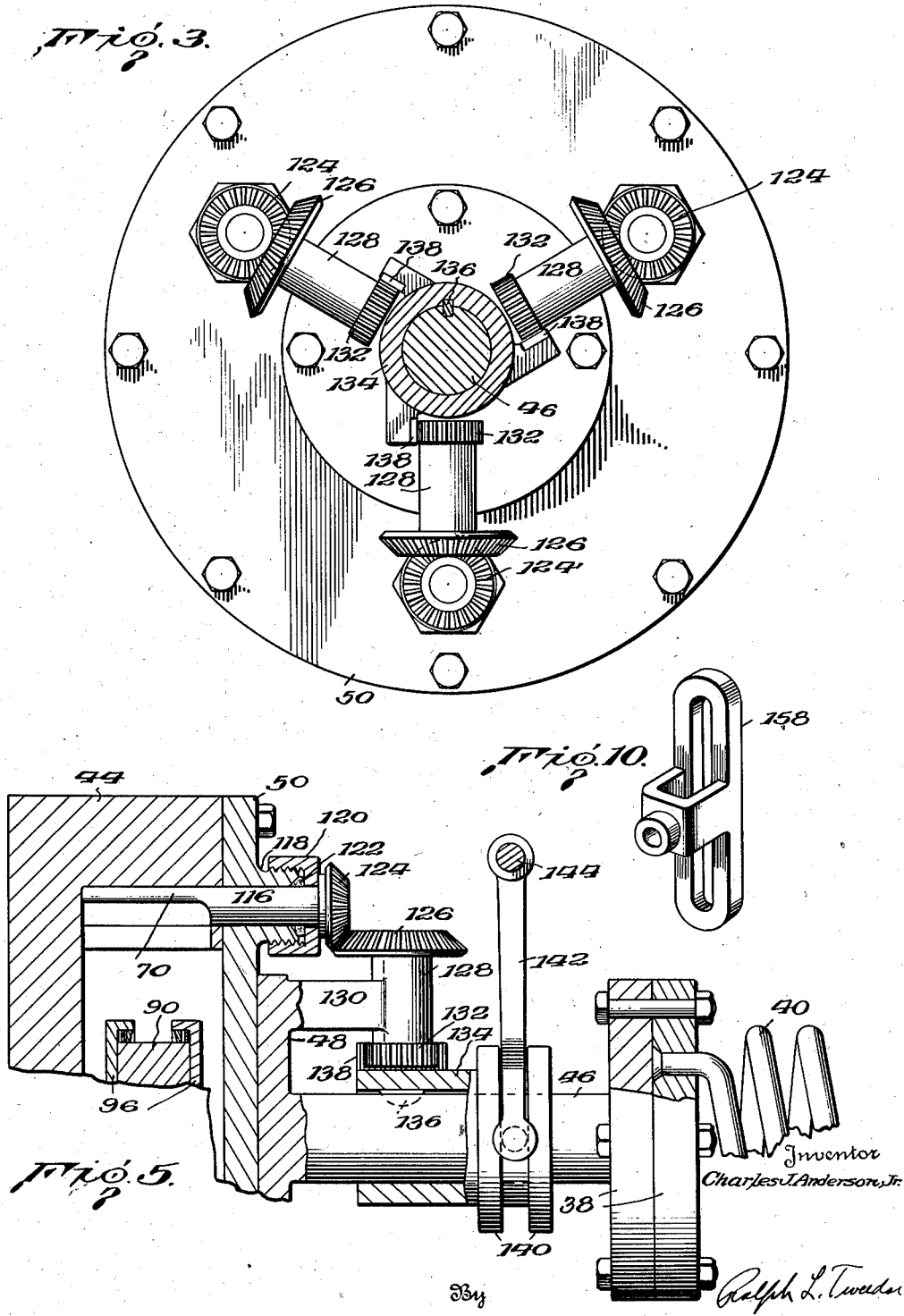

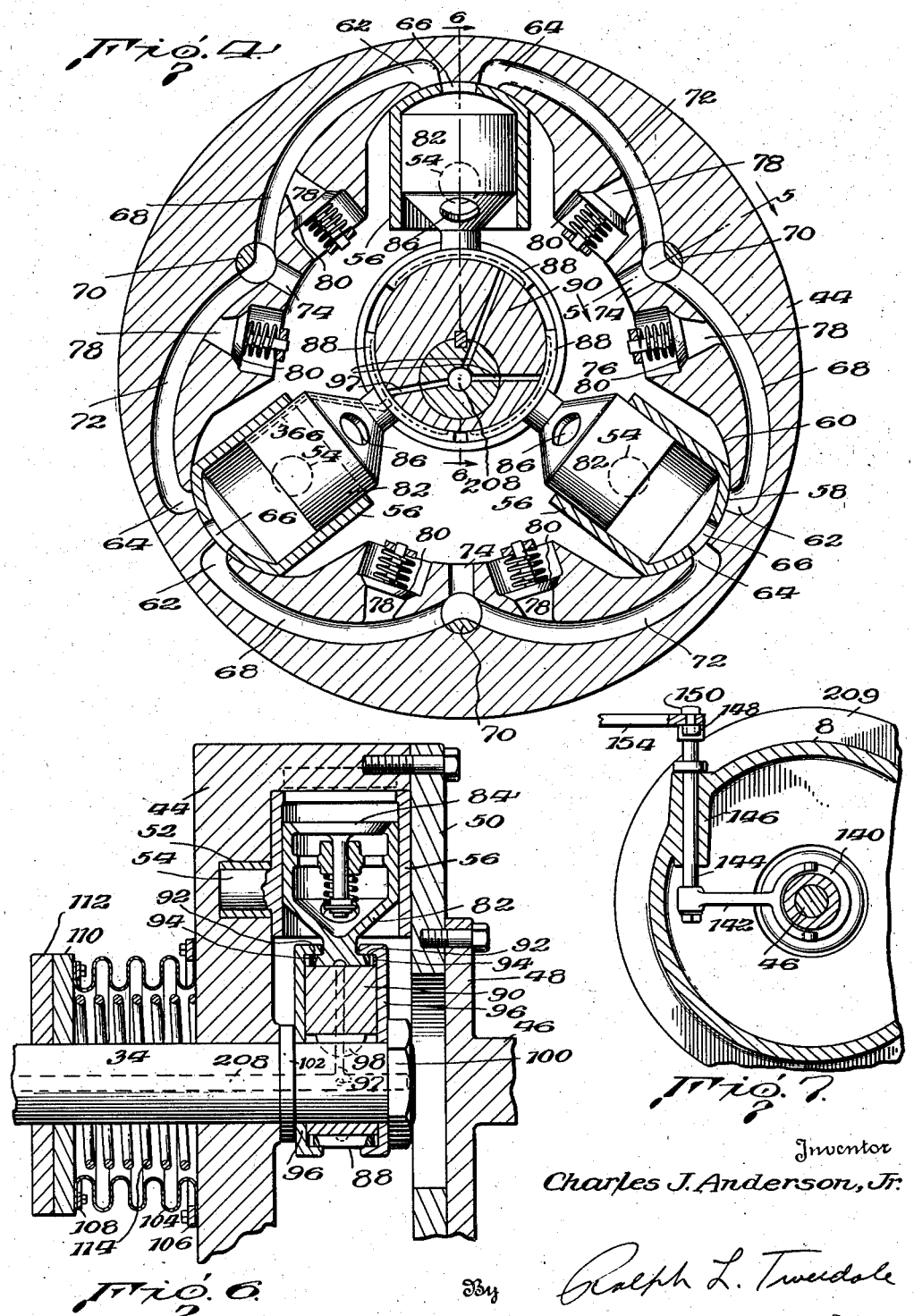

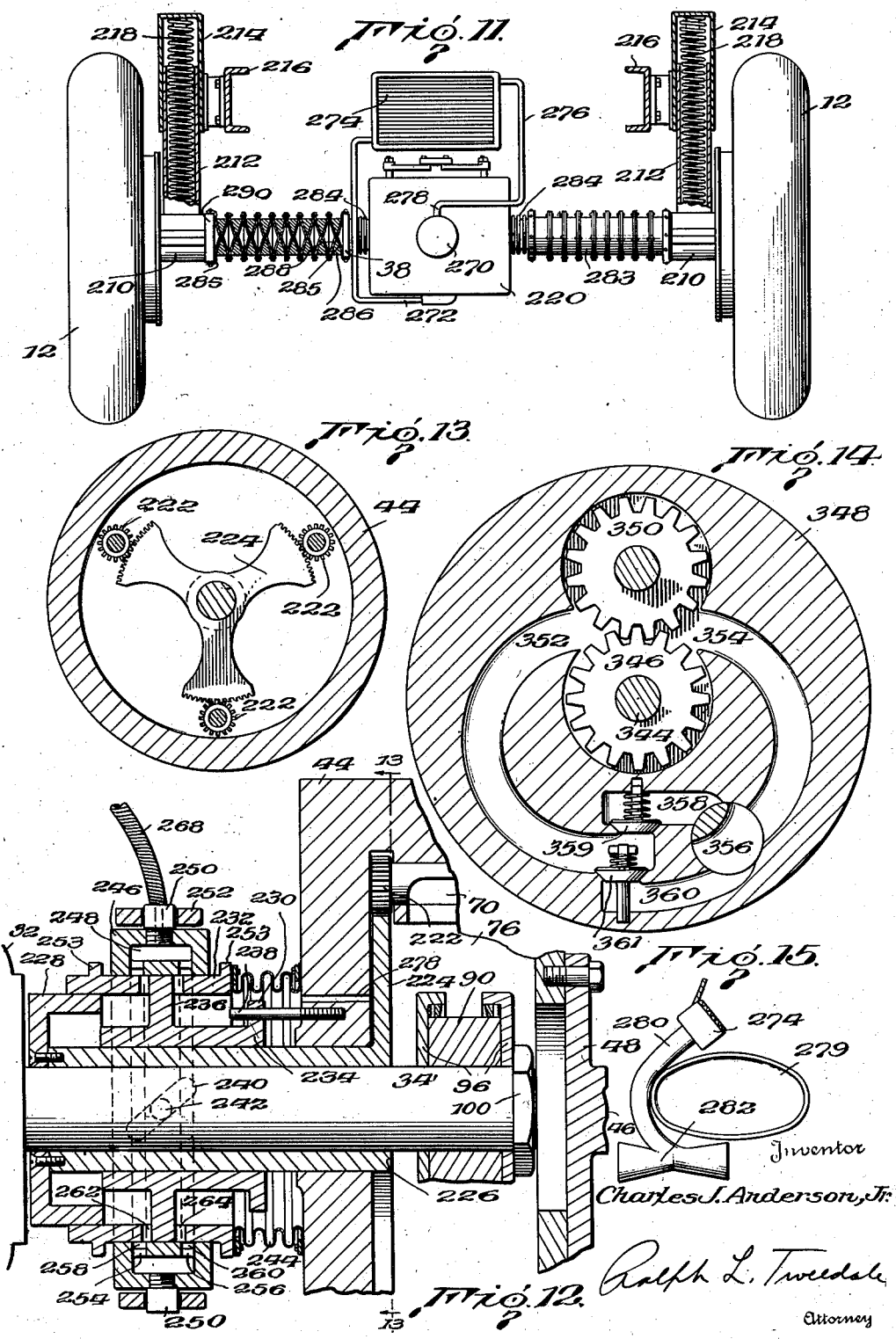

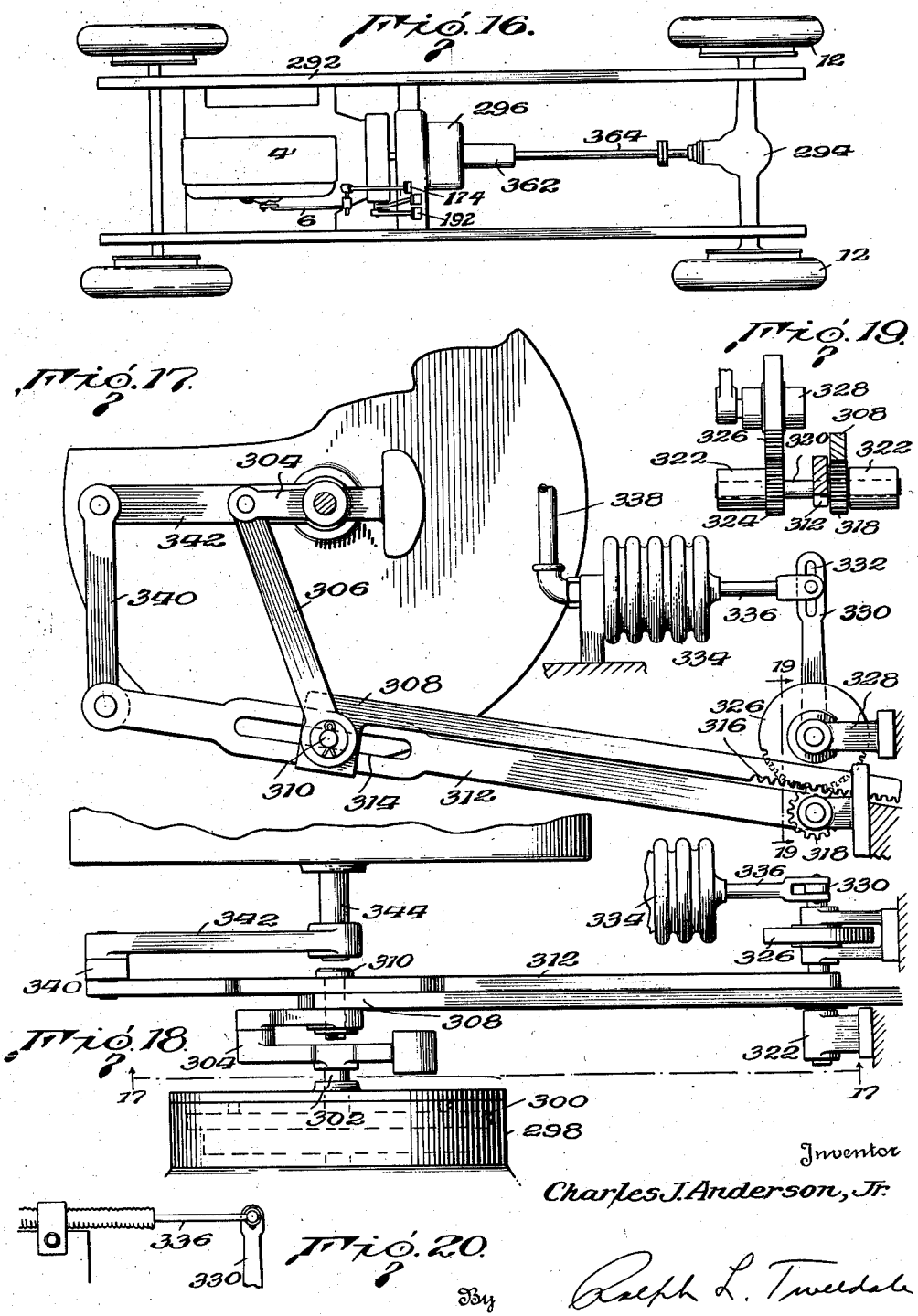

Patented July 13, 1937

2,086,889

UNITED STATES PATENT OFFICE 2,086,889

POWER TRANSMISSION

Charles J. Anderson, Jr., Jamestown, N. Y.

Application July 6, 1932, Serial No. 621,080
Renewed December 7, 1936

75 Claims. (Cl. 180—70)

This invention relates to power transmissions of the type in which the ratio of torque and speed transmission from a driving shaft to a driven shaft may be varied continuously and gradually within the limitations of operation of the transmission and wherein this variation of ratio may be made to take place automatically in accordance with the conditions of load and speed. The objects of this invention are:

(1) To provide an automatic, continuously variable, transmission of simple and rugged mechanism which will automatically vary the ratio of transmission between two shafts to secure the optimum ratio for any given condition of load and speed.

(2) To provide a transmission of this type comprising relatively few simple mechanical elements.

(3) To provide a transmission in which variation of ratio is secured by selectively transferring torque impulses from the driving member to the driven member and in which this selective transfer is automatically varied according to a definite law in response to changes in speed and load conditions, means being also provided for manually changing the factor by which the law operates.

(4) To provide an automatic, continuously variable, transmission comprising a one-way clutch, means for oscillating a driving member of the one-way clutch from a driving shaft, and torsionally resilient means for transferring motion of the driven member of the one-way clutch to a driven shaft.

(5) To provide an automatic transmission having control means by which the direction of motion of the driven shaft may be readily reversed.

(6) To provide an automatic transmission having control means whereby an element of the transmission may be made to operate as a brake.

(7) To provide an automatic transmission suitable for installation in a motor vehicle in place of the conventional friction clutch, sliding gear transmission, and geared rear axle drive whereby these conventional elements may be eliminated without sacrificing any of their performance characteristics and at the same time reducing the cost of manufacture.

(8) To provide an automatic, continuously variable, transmission for automobiles in which power is transmitted from the forwardly located engine arranged longitudinally of the automobile to the rear wheels thereof, rotating on a transverse axis without the use of gears.

(9) To provide an automatic, continuously variable, transmission for automobiles which is readily adaptable to axle constructions wherein the centrally located power transmission mechanism in the driving axle may be rigidly secured to the automobile frame, flexible transmission shafts being provided from this mechanism to the wheels for permitting relative movement between the wheels and frame.

(10) To provide an automatic, continuously variable, transmission which may be located in the position at the rear of the engine in which the clutch and sliding gear transmission are conventionally located.

(11) To provide a rugged and reliable one-way clutch mechanism which will maintain its efficiency over long periods of continuous operation at high loads and speeds.

(12) To provide a novel form of torsionally resilient shafting which may also be capable of a certain amount of bending movement while transmitting high torque.

(13) To provide a one-way clutch including a fluid pump having means for cooling the fluid circulated therethrough.

(14) To provide a one-way clutch including a fluid pump in which fluid is injected into the pump at greater than atmospheric pressures.

(15) To provide a one-way clutch having a fluid pump and means for limiting the fluid pressures developed therein to safe values.

(16) To provide an automatic, continuously variable, transmission having control means by which speed and torque output in a given direction may be controlled entirely by a single foot pedal, equivalent to the conventional accelerator, in which free wheeling may be effected automatically after a period of power transmission by retractive movement of the single control pedal by a certain amount, and a braking effect similar to that produced by the engine when coasting in gear with the usual selective gear transmission may be effected by further retractive movement of the single control pedal and yet without causing the vehicle to actually drive the engine, manually operable means preferably being also provided for varying the amount of this braking effect produced upon movement of the single control pedal to fully back position.

(17) To provide an automatic, continuously variable, transmission having control means for varying the direction of drive and for effecting free wheeling and braking action in which power means for controlling the transmission elements may be placed into operation manually.

(18) To provide control means for an automatic, continuously variable, transmission and its driving motor which may be operated from a single means such as a foot pedal whereby the torque and speed of the driven member may be varied.

Further objects and advantages of the present invention will be apparent from the following description, reference being had to the accompanying drawings wherein three principal embodiments of the present invention are clearly shown.

Fig. 1 is a plan view of an automobile chassis including the first embodiment of the invention.

Fig. 2 is a horizontal cross section through the rear axle of the chassis of Fig. 1.

Fig. 3 is a cross section on line 3—3 of Fig. 2.

Fig. 4 is a cross section on line 4—4 of Fig. 2.

Fig. 5 is a partial cross section on line 5—5 of Fig. 4.

Fig. 6 is a partial cross section on line 6—6 of Fig. 4.

Fig. 7 is a partial cross section on line 7—7 of Fig. 2.

Fig. 8 is a side view of the control mechanism.

Fig. 9 is a top view, partially in cross section, of the control mechanism of Fig. 8.

Fig. 10 is a detail of a part of the control mechanism of Fig. 8.

Fig. 11 is a transverse section of an automobile chassis embodying a second form of the invention.

Fig. 12 is a partial cross section of the mechanism of Fig. 11 corresponding to that shown in Fig. 5.

Fig. 13 is a cross section on line 13—13 of Fig. 12.

Fig. 14 is a cross section of a modified form of one-way clutch.

Fig. 15 is a cross sectional view of the rear part of an automobile showing a means for cooling the fluid circulated through the transmission.

Fig. 16 is a plan view of an automobile chassis embodying a third form of the invention.

Fig. 17 is a cross section on line 17—17 of Fig. 18.

Fig. 18 is a plan view of the internal mechanism of the form of the invention shown in Fig. 16.

Fig. 19 is a cross section on line 19—19 of Fig. 17.

Fig. 20 is a detail view showing a modification of the mechanism illustrated in Fig. 17.

According to this invention an automatic, continuously variable, power transmission may comprise a one-way clutch, preferably of the fluid pump type, means for oscillating the driving member of the one-way clutch and a torsionally resilient connection between the driven member of the one-way clutch and the ultimately driven shaft. The driven member of the one-way clutch should preferably, but not necessarily, have greater inertia than the driving member thereof. These three elements when suitably connected to a source of power and a resisting load, will act automatically to transmit torque to the driven shaft in accordance with the load thereon, and the difference between its speed and the speed of the driving shaft. The operation may be briefly explained as follows:

With the speed of the driving member at a low value such that it will not turn the driven shaft, the driving and driven elements of the one-way clutch are oscillated back and forth in unison and thus the torsionally resilient connection is alternately wound and unwound. On the forward stroke the driving member transmits its motion to the torsionally resilient member through the clutch while on the back stroke the driving element is moved by the source of power, the driven element being moved solely by the energy stored in the torsionally resilient element. As the speed of the driving member is increased, a point is reached at which the source of power can rotate the driving element of the one-way clutch on its back stroke faster than the torsionally resilient element can rotate the driven element of the one-way clutch backward due to the inertia of the latter. Under this condition, as soon as the backward movement of the driving element of the one-way clutch is completed, another forward movement begins and immediately the one-way clutch takes hold and drives the driven element of the one-way clutch forward before it has had time to complete its full backward stroke. At the completion of this forward stroke the torsionally resilient element will be wound tighter than it was at the completion of the next previous forward stroke and if the resulting torque on the driven shaft is sufficient, it will be rotated forwardly to permit the torsionally resilient element to unwind. This action is repeated upon successive cycles of operation, thus producing forward motion of the driven shaft. The amount of torque produced at the driven member is thus automatically maintained to that required by the load as long as the speed of the driving member is kept up to a point where it will produce such a torque.

In Fig. 1 there is shown an automobile chassis having a frame 2 in which is located an engine 4 having a throttle control lever 6. A housing 8 contains the mechanism of the automatically variable transmission. Power is transmitted from the engine to the housing 8 by propeller shaft 10. The housing 8 may take the place of the conventional rear axle housing and carries at its opposite extremities the wheels 12.

Referring to Fig. 2, the wheels 12 are carried on a driven shaft 14 rotating in bearings 16. The propeller shaft 10 enters the housing 8 on its forward side and is journaled in a ball bearing 18. Immediately to the rear of the bearing 18 the shaft 10 is provided with means for oscillating the driving member of a one-way clutch, which may consist of an angularly offset portion 20 forming the base element of a swash plate. In the rear of the portion 20 the shaft 10 is again coaxial with its forward portion and journaled in a ball bearing 22. On the portion 20 of shaft 10 is mounted a pair of antifriction bearings 24 upon which is journaled a sleeve 26 having cutout side portions 28. Journaled on pivots 30 at the top and bottom of the sleeve 26 is a yoke 32. On either side of the yoke 32 are shaft extensions 34 which may be coaxial with the wheel shafts and which carry the driving member of a one-way clutch, designated generally in Fig. 2 as 36. The driven member of the one-way clutch is connected by means of flanges 38 to a torsionally resilient element which may comprise a helical spring 40. Other forms of torsionally resilient elements may be used such as springs in tension, compression, or flexure, rubber, or a body of elastic fluid. The opposite end of this spring 40 is connected by means of a flange 42 to driven shaft 14.

In Figs. 3 to 7 is shown a preferred form of one-way clutch which comprises a housing 44 connected by means of a shaft 46 to the flange 38. The shaft 46 is fastened by means of a flange 48 to a plate 50 which is removably attached to the housing 44 for permitting assembly of the device and access to the mechanism for repairs. The housing 44 has three bearings 52 in which are journaled trunnions 54 of a set of oscillating cylinders 56. The outer surface 58 of the cylinders 56 is made cylindrical in shape, concentric with the trunnions 54, and abuts against a correspondingly shaped surface 60 in which are located two ports 62 and 64. The outer surface of the cylinder has a port 66 equal in width to the ports 62 and 64 and to the space between them and is adapted to register with either port in certain positions of the cylinder 56. Each port 62 of one cylinder is connected by a passage 68 within the housing 44 to a three-way valve 70 which is in turn connected to a passage 72 leading to the port 64 of the adjacent cylinder. The valve 70 is also connected to a passage 74 leading to an internal fluid containing space 76 within the housing 44. Each passage 68 and 72 is in communication with a passage 78 leading to a spring-tensioned safety valve 80. Within each cylinder 56 is located a piston 82 adapted to reciprocate therein. The pistons 82 have spring-tensioned intake valves 84 which are adapted to permit fluid to pass from the space 76 through a series of ports 86 in the bottom of the pistons 82 and through the pistons into the cylinder chamber.

The lower part of each piston 82 carries a sector-shaped bearing 88 which is held in contact with an eccentric 90 by means of beveled, annular, rings 92 urged by corrugated flat springs 94 against the correspondingly beveled sides of the sectors 88. The total circumferential length of the three sectors 88 is somewhat less than a complete circle in order to permit relative displacement of the sectors about the circumference of the eccentric 90 during rotation of the same, inasmuch as no pivoted joints are provided between the sectors 88 and the pistons 82. Flanged disks 96 are provided on either side of the eccentric 90 to hold the springs 94 and rings 92 in place. The flanges of the disks 96 also slightly overlie the sides of the sectors 88, but do not necessarily come in contact with them. The sectors 88 are maintained in contact with eccentric 90 by the action of springs 94 which push the beveled rings 92 against the correspondingly beveled sides of sectors 88 forcing them toward eccentric 90. The eccentric 90 together with the disks 96 is secured to the shaft 34 by means of a key 98 and a nut 100 which latter clamps the eccentric and flanges against a flange 102 removably secured to the shaft 34. A fluid passage 97 conducts lubricating fluid to the bearing surfaces from a passage 208 to be later described.

Means may be provided to prevent fluid leakage between the housing 44 and the shaft 34 which may consist of a bellows 104 secured to the housing 44 by ring 106 and at its opposite end secured by a ring 108 to a disk 110. A disk 112 is secured to the shaft 34 and a spring 114 inside the bellows 104 presses the disk 110 against the disk 112, disk 110 rotating with the housing 44 and disk 112 rotating with shaft 34.

Referring now to Figs. 3 and 5 there is illustrated therein means for moving the three-way valves 70 including gearing and linkage for operating the same from outside the housing 8. The valves 70 have shanks 116 which extend through the plate 50 upon which is formed a boss 118 at each shank 116. The boss 118 is screw-threaded externally to receive a stuffing box cap 120 for sealing the passage around the shank 116 by means of packing 122. The external end of shank 116 carries a bevel gear 124 which mates with a bevel gear 126 mounted on a shaft carried in a bearing 128 at right angles to the axis of valve shank 116. The bearing 128 is carried by a bracket 130 mounted on the flange 48. A spur gear 132 is secured to the opposite end of the shaft within the bearing 128 and turns with bevel gear 126. Upon shaft 46 is mounted a sleeve 134 connected to the shaft 46 by means of a feather key 136 for axial sliding without relative rotation. Upon the sleeve 134 are mounted three racks 138 which mate with the gears 132. At the outer end of sleeve 134 is carried a pair of flanges 140 between which is located a thrust fork operated by a lever 142 secured to a shaft 144. The shaft 144 is pivotally mounted in a lug 146 (see Fig. 7) in the housing 8 and extends therethrough at the top to receive a lever 148 (see Fig. 1) having an upright pin 150 which is received in a slot 152 of the control rod 154.

The control rod 154 extends forward underneath the floor boards of the automobile and at its forward end has a right angle bend 156 (see Figs. 8 and 9) which enters a slot in a slotted lever 158, shown in perspective in Fig. 10. Lever 158 is secured to a shaft 160 pivoted in a bracket 162 at 164, the shaft 160 being located at the midpoint of the slotted lever 158. Rigidly secured to the lever 158 is a lever 166 having a roller 168 at its outer end. Pivoted at 170 in a bracket 172 is a control pedal 174 having a link 176 connected to the throttle lever 6 of the engine 4 by means of a lost motion connection 177. A spring, not shown, holds pedal 174 in upright position. Rigidly secured to the pedal 174 at its pivot is a cam 178 having a short rise portion 180 and a longer dwell portion 182. A spring 184 urges the lever 166 with its roller 168 into engagement with the cam 178. Secured to the bracket 162 is a tube 186 within which is slidably mounted a stop 188 against which the lever 166 may rest when not in engagement with the cam 178. The stop 188 is secured to the movable element of a Bowden control wire 190 which leads to a controlling handle, not shown, which may be mounted upon the dash board for adjusting the position of the stop 188. A foot pedal 192 which may be placed in the position usually occupied by the clutch pedal in a conventional automobile is pivoted at 194 in a bracket 196 secured to the frame of the automobile. A rearward extension 198 of the pedal 192 is connected to a sleeve 200 which surrounds the rod 154 and in which the rod 154 is freely slidable.

Referring again to Fig. 2, at the rear end of the shaft 10 behind the ball bearing 22 is located a fluid pump 202 which may be of any suitable construction such as the well known gear type. An inlet pipe 204 leads from the bottom of the case 8 wherein a pool of fluid is maintained. Any fluid may be used having lubricating qualities and a low rate of viscosity change with temperature. The outlet pipe 205 from the pump 202 is formed into a spiral portion 206 from whence it leads into a passage 208 formed in the yoke 32 and the shaft 34. The passage 208 leads centrally through the shaft 34 to the lubricating passage 97 and to the extreme end of shaft 34 whence it discharges fluid into the central space 76 of the housing 44. As shown in Fig. 2 the spiral portion 206 of the pipe 204 permits a limited oscillation between the yoke 32 and the outlet of the fluid pump 202 without resorting to rotating or sliding packed connections.

The operation of the mechanism so far described may be explained by considering the actions which take place under the following set of different conditions of load and speed. For facilitating the explanation let the engine torque and speed be designated as $T_1$ and $N_1$, respectively, and the wheel torque and speed as $T_2$ and $N_2$, respectively. Neglecting for the present discussion any losses due to friction and to slight delays in valve action in the one-way clutch, it will be seen first that the product $T_1$ and $N_1$ equals the product of $T_2$ and $N_2$ since the power output must equal the power input at 100% efficiency.

If now we consider a condition in which $T_2$ is arbitrarily chosen as, say, 100 units with the engine idling, let the operator depress the control pedal 174 to a point at which the rise portion 180 of cam 178 has just fully passed under the roller 168. The action of this initial depression of pedal 174 will then cause the cam 178 to rock lever 166 and with it slotted lever 158 counter-clockwise through the vertical position and on past to a position in which slotted lever 158 lies as far out of vertical as shown in Fig. 8, but on the opposite side of vertical position. These positions of slotted lever 158 may be termed, respectively, braking position when as shown in Fig. 8, free wheeling position when in vertical position, and driving position when on the opposite side of vertical from braking position. If the pedal 192 is in the raised position, as in Fig. 8, the forward end of rod 154 will rest in the bottom of the slotted lever 158. The motion of slotted lever 158 from braking to driving position will then have moved rod 154 backward its full stroke. Through the pins 150 and slot 152 the control levers 148 together with shafts 144 and forks 142 will have been rotated in opposite directions. The forks 142 acting on the flanges 140 will have moved the sleeves 134 outwardly on shafts 34, causing the valves 70 to be rotated by means of racks 138 and gears 132, 126 and 124. The valves are rotated counter-clockwise in Fig. 4 in this movement and move from a position blocking passage 68, corresponding to braking position of pedal 174, through the position in which both passages 68 and 72 are in unrestricted communication with passages 74, corresponding to free wheeling position, to a position in which passages 72 are blocked, corresponding to driving position. These positions of the valves and operating linkages therefore up to and including the rod 154 may be termed, respectively, reverse position when passages 68 are blocked, neutral position when both passages 68 and 72 are unrestricted and forward position when passages 72 are blocked.

If now the pedal 174 be further depressed, the position of slotted lever 158 will not be changed due to the fact that the dwell portion 182 of cam 178 is now passing under the roller 168. This further depression of the pedal 172 will act through the link 176 to open the throttle of the engine, the lost motion connection 177 acting to prevent opening of the throttle beyond idling position until pedal 174 is depressed to the point where dwell portion 182 of cam 178 comes under the roller 168. Opening of the throttle will, of course, increase the value of $N_1$. The swash plate on the rear end of propeller shaft 10 in its rotation acts to oscillate the yoke 32 about the axis of shafts 34. This oscillation of yoke 32 and with it the shafts 34 oscillates the eccentrics 90 which causes the pistons 82 to be oscillated in the cylinders 56. The internal spaces 76 of the one-way clutches 36 being filled with fluid under pressure by the pump 202, on the forward stroke of oscillation of shafts 34 (clockwise in Fig. 4), the eccentrics 90 will tend to drive the lower right hand piston 82 into its cylinder 56, the cylinder being filled with fluid taken in through the valve 84 and ports 86 on a previous down stroke. The piston 82 will urge the fluid in the cylinder space to pass through the ports 66 and 64 into the passage 72 which is open in this position, but inasmuch as the valve 70 (at the bottom of Fig. 4) is in forward position, blocking passage 72, the fluid column from valve 70 back through passage 72 and port 66 to the head of piston 82 prevents any relative movement between the piston and the cylinder. Relative movement between the eccentric 90 and the body 44 of the one-way clutch being thus blocked, the body 44 will be forced to rotate with the eccentric 90 and shaft 34 on the forward stroke of oscillation. This will wind up spring 40 a certain amount which it may be assumed is insufficient to overcome the initial torque load on wheel 12 at this particular engine speed.

On the back stroke of oscillation of shaft 34 the eccentric 90 will be rotated counter-clockwise in Fig. 4 through the same angle it was rotated forwardly on the forward stroke. The tension of spring 40 will rotate the housing 44 back through the same angle and in unison with the backward rotation of shaft 34 and eccentric 90 so that there is no relative motion between shaft 34 and housing 44. Under these conditions the car will not move, but the oscillations of shaft 34 and eccentric 90 will be simultaneously followed by equal oscillations of the body 44, causing the spring 40 to be alternately wound and unwound. Under these conditions the power output is zero. Therefore, since $N_1$ has a finite value, $T_1$ is zero so that, neglecting losses, the engine is doing no work. This will be seen to be true since the energy that is required to wind up spring 40 on the forward oscillation of shaft 34 is given back to the engine by the unwinding of spring 40, the one-way clutch acting as a rigid connection for spring 40 to turn shaft 34. Operation in the manner just described takes place also when the engine is idling as well as at other times when $N_2$ is at such a low value that the resisting torque on the wheels cannot be overcome.

If now pedal 174 be further depressed and the value of $N_2$ correspondingly further increased to a point where the output torque will become equal to 100 units and the wheels will begin to move, the following actions take place: The first forward stroke of oscillation of shaft 34 positively drives the housing 44 forward with it in the manner just described, but with a greater speed. On the backward stroke the shaft 34 and eccentric 90 are rotated back at this same greater speed. The amount of torque exerted by the spring 40 on housing 44 in a backward direction, which is of the same value as it was under the conditions of operation previously described, is now insufficient to rotate the housing 44 backwardly as fast as the eccentric 90 is moved backward by the swash plate 20. This is due to the inertia of the housing 44. In other words, the eccentric 90 will be rotated counter-clockwise in Fig. 4 relative to the housing 44. The lower left hand piston 82 will be forced into the cylinder 56 and the fluid therein will be forced through port 66 into the passage 68. The valves 70, being still in the forward position, leave passage 68 open to passage 74. It will be seen then that the only resistance to relative motion of eccentric 90 and housing 44 in this direction is the slight resistance entailed by pumping the fluid through the passages 68 and 74. It will be understood that a similar action takes place in each of the three cylinders as the pistons come into proper position for moving into the cylinders, while as the pistons are moved out of the cylinders the valve 84 permits fluid to pass from the space 76 into the cylinder space in each case.

At the completion of this first back stroke of oscillation of shaft 34 the housing 44 will have been rotated backwardly through a smaller angle than the eccentric will have moved. At the beginning of the next forward stroke of oscillation of shaft 34 the housing 44 will immediately be connected to the shaft 34 through the action of the one-way clutch, described above, and the housing 44 will, therefore, follow the shaft 34 through the full forward stroke of oscillation. At the end of this stroke the housing 44 will be displaced forwardly by a greater angle than the shaft 34, since on this forward stroke the housing 44 was picked up by the one-way clutch, at an angular position somewhat forward of the starting position of housing 44. This will wind the spring 40 to a point where the resulting torque on the wheels 12 will be sufficient to overcome the resisting torque $T_2$ and the wheels will be turned a slight amount at a speed $N_2$. Actually what takes place is that the spring 40 unwinds from both ends, utilizing a portion of its surplus energy to overcome the resisting torque $T_2$ and utilizing the other portion of the surplus energy to rotate the housing 44 backward at a slightly greater speed than was the case on the first backward oscillation, described above. This operation will continue to take place as long as the value of $T_2$ and $N_1$ remain the same, the wheels turning forward continuously at a speed $N_2$ which depends on the value of $N_1$. Similar actions to those above described take place under all conditions of forward motion, the only changes being in the relative values of $N_1$, $T_1$, $N_2$ and $T_2$.

With the car under motion and driven by the motor if the pedal 174 be retracted to free wheeling position, this will cause the motor throttle to move back to idling position and shift the valves 70 into neutral position. The one-way clutch 36 is now ineffective to be driven either forward or backward, the housing 44 and the shaft 34 being free for unlimited relative movement. The idling of the motor will, of course, slowly oscillate shaft 34. However, this produces no total resulting motion either forward or backward on the shaft 34. The momentum of the car will cause the wheels to turn the housing 44 through spring 40, this rotation being permitted unhampered by the one-way clutch 36. The car is, therefore, free to roll in the same manner as a conventionally constructed automobile rolls when the clutch is disengaged or the gears are in neutral.

Upon further retraction of pedal 174 the valves 70 are moved into reverse position, the lost motion connection 177 between pedal 174 and the engine throttle permitting this motion of pedal 174 without affecting the engine throttle. As the car continues to roll forward under its momentum the relative rotation between housing 44 and shaft 34 will be the same as if shaft 34 and eccentric 90 were rotated counter-clockwise in Fig. 4 while housing 44 remains stationary. There is, of course, a periodic increase and decrease in this relative motion due to the oscillation of shaft 34 by the idling motor, but this may be neglected since the total resultant motion is all that need be considered. Under these conditions of relative rotation the pistons 82 will act to force fluid into the passages 68 which are blocked by the valves 70 being in reverse position. Were it not for the safety valves 80 the wheels would be immediately locked, but the springs for these valves 80 may be so calibrated that they permit pressure in passages 68 to build up to such a value that the wheels will not quite skid. What takes place is a continual pumping of fluid into the passages 68 and out through the safety valves 80 into the space 76. The resistance to the passage of fluid through the valves 80 absorbs a large amount of energy which causes a strong braking effect to be exerted on the wheels, depending, of course, on the speed at which the car is rolling. This very much simulates the braking action secured in the conventional automobile when the car is permitted to roll in gear but with the engine throttle closed, using the engine as a brake. The safety valves 80, of course, act to prevent dangerous pressures building up during forward drive as well as during the braking action, while coasting, and if calibrated, as is described, will also prevent the driving torque on the wheels from becoming great enough to skid the wheels. The braking action produced, moreover, may be applied gradually to any degree. In other words, the valves 70 may be moved gradually from neutral position to reverse position and may be held in any intermediate position desired. Thus, it is possible for the operator to produce any degree of fluid braking at will merely by varying the position of the pedal 174, the maximum amount being determined by the setting of the safety valves or alternatively by the position of the manually controlled stop 188.

The manually adjustable stop member 188 which abuts the lever 166 can be controlled so as to vary the position of the valves 70 when pedal 174 is in braking position. Thus the stop 188 if fully withdrawn into its tube 186, permits the valves 70 to move into full reverse position when pedal 174 is in braking position, producing the degree of braking effect just described. However, if the stop 188 is moved somewhat out of its tube 186, this will prevent the lever 166 from moving back far enough to move valves 70 into full reverse position, but will leave them resting in the position where they permit a slight flow of fluid from passages 68 to passages 74. Under these conditions the braking action will be weaker than when the stop 188 is fully withdrawn into its tube 186. Thus the amount of braking action which is secured by permitting pedal 174 to move to braking position can be varied manually by the manual control wire 190 to suit a driver's personal preference under any road conditions. The stop 188 may be so constructed if desired that when fully retracted it holds roller 168 slightly away from cam 180. This will hold the valves 70 slightly out of full reverse position when pedal 174 is in braking position and pedal 192 in forward position and cause the braking action to take place always at valves 70 and never at valves 80. When the stop 188 is so constructed, or constructed as previously described, and manually adjusted to hold valves 70 slightly open in braking position of pedal 174 the car wheels may be braked by the conventional brakes when it is at rest and the springs 40 will be permitted to slowly unwind by forcing fluid through the slightly open valves 70. This does away with the inconvenience of having the car roll slightly when the brakes are released after the car has been at rest on account of energy which may have been stored in springs 40 on the last cycle of operation and which was prevented from being dissipated due to setting of the brakes and full closure of valves 70.

The purpose of the pedal 192 is to change the direction of motion of the driving action of the transmission. With the pedal 192 in the retracted position shown in Fig. 8 in which it is normally held by a spring, not shown, the car will be driven forward upon depression of pedal 174. If the pedal 192 be depressed half-way to the floor, this will cause the forward end of rod 154 to be raised in the slotted lever 158 to a point directly coincident with the pivotal axis 164 of said lever since as pedal 192 is depressed lever arm 198 connected thereto will be raised, carrying with it the sleeve 200 and the rod 154. In this position of pedal 192 the valves will have been shifted to neutral position since in moving the rod 154 to the middle of slotted lever 158 the rod 154 will have been moved backward one-half its full stroke. Depression of the pedal 174 under these conditions will rotate slotted lever 158, but it will have no effect on the rod 154 since the forward end of that rod is on the pivotal axis of slotted lever 158. The only effect of depressing pedal 174 will be to speed up the motor. This neutral position of pedal 192 may be utilized when it is desired to race the motor without moving the car either forward or backward.

If the pedal 192 is fully depressed, the forward end of rod 154 will be moved clear to the top of slotted lever 158. Simultaneously the valves 70 will be moved to forward position if pedal 174 is in the raised position shown in Fig. 8. It should be noted that forward position of valves 70 is braking position for reverse movement of the car. With the pedal 192 fully depressed depression of pedal 174 will cause the car to move backward, the same actions taking place as in forward motion except that the direction of motion of the various parts is reversed. Thus with the pedal 174 in braking position valves 70 are in forward position, with pedal 174 in free wheeling position, valves 70 are in neutral position, and with pedal 174 in driving position valves 70 are in reverse position. This causes one-way clutch 36 to take hold on the back stroke and release on the forward stroke, the action otherwise being the same as that described on forward motion.

The fluid pump 202 causes a continual circulation of fluid from the sump in the bottom of casing 8 into the one-way clutch 36. The fluid leaks out of clutch 36, between disks 110 and 112 and also around valve stems 116. If the capacity of the pump is made sufficiently large, some or all of the shaft packing means may be omitted, permitting greater leakage between shaft 34 and housing 44 and, or, around the valve stems 116. This will increase the circulation of fluid from the housing 8 into clutch 36 and out again. Flanges 209 may be provided on the outside of casing 8 for more readily conducting the heat imparted to the fluid in the clutch to the outside air.

In Figs. 11, 12 and 13 there is illustrated a second embodiment of the invention which is adapted for use in a motor vehicle having independently sprung wheels or one in which a dummy axle may be provided, but in which the centrally located axle driving mechanism is rigidly attached to the frame of the vehicle and does not move up and down with the wheels and dummy axle. In this construction wheels 12 are carried in bearings 210 which are mounted on vertical tubes 212. These tubes telescope into vertical tubes 214 mounted on the frame 216 of the vehicle. Springs 218 inside tubes 212 and 214 support the vehicle resiliently on the wheel bearings 210. A housing 220 is also rigidly secured to the frame and contains therein a mechanism which may be either identical or equivalent to that contained in the enlarged part of the housing 8 in Fig. 1. In other words, this may contain a swash plate on the propeller shaft axis and a pair of one-way clutches with their control mechanism on either side thereof on the transverse axis of the wheels. This mechanism may be identical to that described in the first modification or it may be constructed as about to be described. In the present modification the structure of the swash plate is identical to that shown in Fig. 2. The structure of the main operating parts of the one-way clutch, namely, the pump elements and valves, is substantially identical to that in Fig. 4. The control means for the valves 70 is, however, modified, adapting it for power operation under manual control. Each of the valves 70 carries at its inner end a spur gear 222. These spur gears 222 mesh with a mutilated gear 224 which is integral with a tube 226 journaled on shaft 34 and on which the housing 44 rotates. On the left hand end of tube 226 in Fig. 12 a cup 228 is secured which forms part of a fluid pressure chamber. Mounted for axial sliding movement on tube 226 is a sliding collar 230 composed of two concentric cylinder members 232 and 234 of different diameters and connected by a disk-like partition 236. The collar 230 is prevented from rotating relative to housing 44 by pins 238 which pass through suitable holes in the flanged end of inner cylinder 234. The inner cylinder 234 has a pair of spirally shaped slots 240 formed therein at diametrically opposite sides in which a pair of pins 242 secured to sleeve 226 are adapted to slide. This is for the purpose of rotating the sleeve 226 by moving the collar 230 axially upon the same. A bellows 244 seals the space between the housing 44 and the outer cylinder 232, permitting relative axial movement.

An outer ring member 246 surrounds the cylinder 232 and has a hollow fluid chamber 248 therein which may extend completely around the ring. The ring 246 has pins 250 extending outwardly therefrom at diametrically opposite points for connection to the shifting fork 252 which corresponds to the fork 142 of the first modification. Flanges 253 are provided on the external surface of the cylinder 234 for limiting the movement of the ring 246 thereon. Fluid ports 254 and 256 lead from the passage 248 to the internal surface of the ring 246 at a plurality of points around the ring and are connected at the internal surface by annular grooves 258 and 260; a plurality of ports 262 and 264 pass through the outer cylinder 234 on opposite sides of the partition 236. The space between grooves 258 and 260 is such that it almost, but not quite, closes both ports 262 and 264 when in a position midway between them. A flexible tube 268 leads from the outlet, not shown, of fluid pump 270 to the fluid chamber 248. The pump 270 may take its supply of fluid from the bottom of housing 220 from a pipe 272 which leads to a fluid cooling radiator 274 and from thence by pipe 276 to the intake 278 of the pump 270 while the outlet of pump 270 is on the inside of the casing. The tube 268 leads from the outlet of pump 270 to the fluid passage 248. The shifting fork 252 is connected by a mechanism which may be identical to that shown in Figs. 7, 8 and 9 to the control pedals 174 and 192. Movement of the control pedals 174 and 192 shifts the valves 70 to the same positions as they are shifted by corresponding movements in the structure of the first modification with the parts in the position shown in Fig. 12.

Fluid is pumped by the pump 270 from the bottom of the case 220 through radiator 274 and to the fluid chamber 248. From thence it flows equally through ports 254 and 256, grooves 258 and 260, ports 260 and 264, into the fluid chambers on either side of the partition 236. From the chamber on the righthand side of partition 236 the fluid flows through a small port 278 into the interior portion 76 of the one-way clutch. There is also some leakage to the same place between housing 44 and sleeve 226. From the fluid chamber on the lefthand side of partition 236 the fluid flows into the housing 220 between cup 228 and outer cylinder 232. From the chamber 76 fluid leaks out between shaft 34 and sleeve 226 to the housing 220. These leakage paths from the two fluid chambers out to the inside of housing 220 are made of about identical resistance to permit an appreciable portion of fluid to flow therethrough for cooling purposes. However, the resistance of these paths should be great enough to permit an appreciable pressure difference between the two fluid chambers and the approximately atmospheric pressure in the housing 220. There is also some resistance to the flow of fluid from grooves 258 and 260 through ports 262 and 264 in order to have a higher pressure in chamber 248 than that in the fluid chambers within collar 230.

A fluid passage 366 (see Fig. 4) is formed in the piston 82 for lubricating the bearing segments 88. This passage may be made of such a size as to produce a throttling effect to deliver fluid to the bearing segments at a pressure considerably below that in the cylinder chambers.

Shifting of fork 252 to the left in Fig. 12 will move ring 246 also to the left and close port 262 from communication with groove 258, at the same time opening port 264 into wider communication with groove 260. This will permit the pressure in the lefthand fluid chamber to drop due to leakage into housing 220 and will at the same time increase the pressure in the righthand fluid chamber, thus causing the collar 230 to move to the left a corresponding amount to again equalize the opening of ports 260 and 264 to their respective grooves and thus equalize the pressure within the two fluid chambers. This moving of the collar 230 to the left will cause rotation of the sleeve 226 in a counter-clockwise direction in Fig. 13, mutilated gear 224 taking a corresponding rotation. This will rotate the valves 70 in a clockwise direction in Fig. 13. In other words, the valves 70 will move from neutral position to reverse position during this movement of ring 246 to the left in Fig. 12. A similar action takes place upon any movement of ring 246 either to right or left, the change in opening of the ports 262 and 264 causing the change in fluid pressure on opposite sides of the partition 236 and thus making the collar 230 follow the movements of the ring 246. It will be seen, therefore, that the only force necessary to be exerted on the control pedals is that required to shift the ring 246 on the collar 230 which is only a very small amount. The larger force required to rotate valves 70 is furnished by the fluid pressure supplied by the pump 270.

In order to avoid piping the fluid a great distance from housing 220 to radiator 274 this radiator may be located, as shown in Fig. 15, directly above the customary location of the gas tank 279 at the bottom rear portion of the body. An air conduit 280 leads from the inside of the radiator 274 downwardly to a venturi 282 in the air stream underneath the car for the purpose of drawing air from the rear of the body through the radiator 274. Should the body be so shaped that a reduced pressure is caused at the bottom rear portion thereof by the air flow around the car in motion the air conduit 280 may lead to a funnel opening forwardly into the air stream underneath the car and forcing air from the funnel through the conduit 280 and out through the radiator to the zone of low pressure air at the rear of the body. Either arrangement described for causing air flow through the radiator may be selected in accordance with the aerodynamic characteristics of the body used.

The resilient couplings between the one-way clutches and the wheels in the present modification are composed of rubber rather than a metallic spring. The bodies 44 of the one-way clutches have their shafts 46 extending through the housing 220 and are sealed against escape of fluid by self-adjusting packings 284, similar in construction to that located between housing 44 and shaft 34 in Fig. 6. The flanges 38 of the shafts 46 have secured thereto, as by screws, a sheet metal disk 285 which is formed in the shape of a very flat cone. Vulcanized or otherwise secured to this disk 285 is a section of rubber or other suitable highly flexible resilient material 286, cylindrical in shape, and thicker in the direction of the wheel axis at its periphery than at its center to correspond to the shape of the disk 285, and another flat cone-shaped disk 288 is vulcanized to the opposite face of the section 286. A plurality of these rubber sections 286, having sheet metal disks on either side thereof, are located adjacent to each other with the projecting flanges of the disks 288 secured together as by rivets. The end disk 285 at each end of the assembly has its flange shaped to be secured to the flange 38 and the flange 290 of the stub axle of the wheels 12. Thus there is provided a torsionally resilient element which is also capable of a certain amount of bending motion in which the rubber sections 286 may each partake of torsional stress, acting in the same manner as the spring 40 in Fig. 2.

The purpose of making the disks cone-shaped rather than flat is to reduce the amount of rubber between disks near the center of the assembly as compared to that at the periphery. This produces the equalization of the stress throughout the section of the rubber inasmuch as at any distance from the axis of the assembly the thickness of the rubber between the disks is proportional to the length of arc through which one disk moves relative to the other for any angular displacement. The sheet metal disks interposed between the sections of rubber act to prevent knotting of the assembly which would take place if a single long shaft of rubber were used.

The operation of this modification in response to movement of the control pedals 174 and 192 is identical to that of the first modification, the only differences being those explained above in the operation of the valve shifting mechanism. The action of the resilient member 283 is the same as that of the springs 40.

In Figs. 14, 16, 17, 18, 19 and 20 is illustrated a third modification of the invention wherein a transmission of the general type described is provided which may be located in the position conventionally occupied by the friction clutch and sliding gear transmission immediately at the rear of the automobile engine. This modification is also adapted for any application other than in an automobile wherein it may be desired to have the driven shaft located on the same axis as the driving shaft. There is also provided in this modification means for varying the factor of operation by which the transmission automatically selects the optimum ratio for any conditions of load and speed. This means may be either operated automatically in response to changes in engine load, engine speed, car load or car speed, or combinations of these; or it may be operated manually.

Referring to the drawings in Fig. 16 there is shown an automobile chassis having a frame 292, wheels 12, rear axle 294 of conventional construction, engine 4 and a throttle connection 6 for the same. Immediately to the rear of the engine is located the housing 296 containing all the elements of the transmission proper. Referring to Figs. 17 and 18 there is shown at 298 the flywheel of the engine within which is contained a permanently set friction clutch through which the transmission is driven and which acts merely as a safety device for preventing overloads upon parts of the transmission. This may comprise merely a conventional friction clutch spring-pressed into engagement by adjustable springs, such as is well known in the art, the springs being adjusted to allow slippage at torque values over any desired limiting amount. Clutch 300 drives a shaft 302 having rigidly secured to its rear end a counterbalanced crank arm 304. Pivoted to the crank arm 304 is a connecting rod 306 which is pivoted at its lower end to a slide bar 308 by a pin 310. The slide bar 308 lies adjacent to a lever 312 having a slot 314 therein through which the pin 310 passes to the opposite side of lever 312 from the slide bar 308. At its right-hand end the slide bar 308 has a rack 316 formed therein which meshes with a pinion 318 secured to a shaft 320 mounted in bearings 322 and which forms the fulcrum of lever 312. Also secured to shaft 320 is another pinion 324 which meshes with a segmental gear 326 pivoted in a bracket 328. An arm 330 is rigidly secured to the gear 326 and has a slot 332 at its uppermost end. A bellows 334 is secured to a fixed point in the housing and carries at its free end a link 336 connected to the slot 332 of lever 330. The bellows is sealed from communication with the atmosphere and a pipe 338 leads from its inside to the intake manifold of the car engine.

The outermost end of lever 312 has pivoted thereto a connecting rod 340 which is pivoted at its opposite end to a crank arm 342. The crank arm 342 is rigidly secured to a shaft 344 which corresponds in function to the shaft 34 in the two previously described modifications. The shaft 344 may be connected to a one-way clutch of the type previously described, or it may be connected to another type of one-way clutch illustrated in Fig. 14. This comprises an intermeshing gear type fluid pump in which a gear 346 is rigidly secured to shaft 344. The body 348 of the one-way clutch is adapted to rotate about shaft 344 in a similar manner to that in which housing 44 rotates about shaft 34. Mounted in a recess in the body 348 is another gear 350 meshing with gear 346 and together with it forming a fluid pump as is well known in the art. Passages 352 and 354 connect with the recesses in which the gears are mounted at opposite sides of the intermeshing point thereof. The passage 354 leads to a three-way valve 356 similar to the valves 70 adapted for placing the passage 354 in communication with either or both of two passages 358 and 360. One-way valves 359 and 361 opening in opposite directions are adapted to place the passage 352 into communication with either passage 358 or passage 360, depending upon the direction of fluid flow. The rear end of clutch body 348 is secured to one end of a resilient element, not shown, but which may be located in the reduced portion 362 of housing 296 and has its rear end in turn connected to the propeller shaft 364.

The fundamental operation of this modification is substantially the same as that of the two previously described. A control mechanism, which may be similar to either type previously described in connection with the first two modifications, connects the valve 356 with the pedals 174 and 192 for operation in a similar manner to the operation of the valves 70. Rotation of the engine flywheel and with it crank 304 causes the lever 312 and slide bar 308 to be simultaneously oscillated about the pivotal axis 320 of lever 312 since crank arm 304 is connected thereto by connecting rod 306. This oscillation of lever 312 imparts a corresponding oscillation to the crank arm 342 inasmuch as the crank arm 304 is considerably shorter than the crank arm 342. Oscillation of crank 342 oscillates with it the shaft 344 and gear 346. It will be seen that with the valve 356 in the position shown in Fig. 14 gear 346 can rotate relative to housing 348 only in a clockwise direction since this direction of rotation forces fluid from passage 352 into passage 354, passage 360, and back to passage 352 through the one-way valve 361. Counter-clockwise rotation of shaft 344 and gear 346 will immediately lock the pump body 348 to shaft 344 since valve 361 blocks fluid flow through the pump in reverse direction. Valve 356 may be rotated counter-clockwise by the control mechanism from the position shown in Fig. 14 first to a position in which the block portion thereof lies intermediate ports 358 and 360, the valve then being in neutral position and permitting relative rotation between gear 346 and housing 348 in either direction of movement. The valve 356 may be further rotated counter-clockwise to a position blocking passage 360 in which case the housing 348 will be locked to the gear 346 in the opposite direction of motion to that when valve 356 blocks passage 358. Oscillation of housing 348 causes winding and unwinding of the resilient element which is connected between the housing 348 of the one-way clutch and the propeller shaft 364. The operations which take place under the different conditions of load and speed are identical to those taking place in the first and second modifications described.

Means is provided in the present modification for varying the factor by which this transmission operates. The slide bar 308 is adapted to be adjusted longitudinally of the lever 312 for the purpose of changing the effective lever arm of connecting rod 306 on lever 312. The mechanism for doing this comprises the elements numbered 318 through 338 in Figs. 17, 18 and 19. The lever 330 when moved to the left turns the pinion 318 through gear 326, pinion 324 and shaft 320. This in turn moves the slide bar 308 to the right through rack 316, decreasing the effective lever arm of connecting rod 306 upon lever 312. The lever 330 may be controlled automatically in accordance with changes in engine speed, engine torque, load speed and load torque, Fig. 17 illustrating one means for accomplishing this in which the lever 330 is moved in response to changes in engine load. Pressure in the intake manifold is roughly proportional to the torque load on the engine. The bellows 334 being in communication with the intake manifold operates to move the lever 330 to the left as the engine torque load decreases. This has the effect of decreasing the lever arm of connecting rod 306 on lever 312. This mechanism just described may be considered as a second infinitely variable power transmission mechanism the action of which is superimposed upon the action of the principal infinitely variable transmission. The lever 330 may also be controlled manually rather than automatically. In that case a convenient means of doing this may be a Bowden wire control 366, shown in Fig. 20, connected to the top end of lever 330 and having a handle, not shown, on its opposite end which may be located in a convenient place on the dash board.

It will thus be seen that this invention provides a simple automatic continuously variable power transmission readily adaptable for various types of automotive construction in which complete control of the power output of the automobile is centralized in a single control lever which for convenience may take the place of the conventional accelerator pedal. The single control lever controls the action of the motor and of the transmission in such a way that the resulting response of the car simulates that of the conventional automobile in high gear with the added advantage that the ratio is automatically selected to best suit the particular driving conditions at any time. In other words, the feel of the accelerator pedal is substantially the same as that of the conventional accelerator pedal except that it is never necessary to shift gears, the car having sufficient torque output at the rear wheels to meet any condition of load. Thus when the accelerator pedal is partially released after a period of power driving the car coasts in much the same manner as a conventional car without free wheeling coasts when the accelerator pedal is released to a point sufficient to permit the engine to just keep up with the car without exerting any driving or braking effect. Also when the accelerator pedal is fully released the car is braked by the fluid pumps in the one-way clutches. The braking torque of these pumps is roughly proportional to the square of the speed in the same way that the braking torque of the engine in the conventional car is roughly proportional to the speed. The driver then can depend on securing this fluid braking action upon release of the accelerator pedal in the same manner as in a conventional automobile without free wheeling. This, of course, greatly increases the safety of the car on the road. In addition, however, it is possible to increase the braking effect to a value greater than that possible to be obtained by engine braking in high gear by simply fully retracting the stop 188 through its manual control mechanism. Furthermore, the amount of braking torque for any given speed of the car may be gradually varied under the convenient control of pedal 174. The effect is very similar to that which would be produced with an automobile having a transmission capable of a gradual change of ratio under manual control and which would be effective at any ratio while coasting with the car driving the engine. There is this major difference, however: With the present invention the car does not actually drive the engine at all, the engine merely running at idling speed regardless of the braking effect produced by the transmission. There is in addition provided, of course, the usual foot brakes and emergency brake conventionally used in automobiles which may be used in the same manner as in a conventional automobile.

While the forms of embodiment of the invention as herein disclosed, constitute preferred forms, it is to be understood that other forms might be adopted, all coming within the scope of the claims which follow.

What is claimed is as follows:

1. In an automatic continuously variable power transmission, the combination of a driving member, a driven member, a one-way clutch having driving and driven elements, means for oscillating the driving element of the clutch, and a resilient connection between the driven element of the clutch and the driven member.

2. In an automatic continuously variable power transmission, the combination of a driving member, a driven member, a hydraulic one-way clutch having driving and driven elements, means for oscillating the driving element of the hydraulic clutch, and a resilient connection between the driven element of the hydraulic clutch and the driven member.

3. In an automatic continuously variable power transmission, the combination of a driving member, a driven member, a one-way clutch having driving and driven elements, means for oscillating the driving element of the clutch, a resilient connection between the driven element of the clutch and the driven member and means for selectively reversing the direction of rotation of the driven member.

4. In an automatic continuously variable power transmission, the combination of a driving member, a driven member, a one-way hydraulic clutch having driving and driven elements, means for oscillating the driving element of the hydraulic clutch, a resilient connection between the driven element of the hydraulic clutch and the driven member and means for selectively reversing the direction of rotation of the driven member.

5. In an automatic continuously variable power transmission, the combination of a driving member, a driven member, a clutch having driving and driven elements, means for oscillating the driving element of the clutch, a resilient connection between the driven element of the clutch and the driven member, and means for gradually changing the action of the clutch from one suitable for forward driving through one in which no driving takes place to one suitable for reverse driving.

6. In an automatic continuously variable power transmission, the combination of a driving member, two driven members on an axis at right angles to the axis of the driving member, a swash plate on the driving member, two torque varying mechanisms on the axes of the driven members, and a connection between the swash plate and the mechanisms for imparting oscillatory movement to both mechanisms simultaneously.

7. In a motor vehicle, a pair of driving wheels, a motor, a continuously variable power transmission driven by the motor, and a separate one-way clutch for each driving wheel forming part of said power transmission whereby one wheel may be permitted to overrun the other in rounding corners.

8. In a continuously variable power transmission, the combination of a driving member, a driven member, an inertia member mounted for rotation independently of the driving and driven members, a torsionally resilient driving connection between the inertia member and the driven member, and means for imparting intermittent power impulses from the driving member to the inertia member in one direction, the relation between the mass of the inertia member and the resiliency of the driving connection being such that the amount of back rotation of the inertia member between power impulses determines the ratio of power transmission.

9. In a continuously variable power transmission, the combination of a driving member, a driven member, and intermediate mechanism for transferring energy from the driving member to the driven member with varying factors of torque multiplication, said intermediate mechanism including means for intermittently transmitting torque through a confined body of fluid which is static while the torque is transmitted.

10. In a continuously variable power transmission, the combination of a driving member, a driven member, means operated by the driving member for producing intermittent torque impulses of opposite sense, an inertia member capable of oscillation independent of the driven member, means for selectively transferring torque impulses of one sense only to the inertia member, and means for transferring torque from the inertia member to the driven member, said inertia member acting to determine the factor of torque multiplication automatically in accordance with the momentary conditions of load and speed.

11. In a continuously variable power transmission, the combination of a driving member, a driven member, means operated by the driving member for producing intermittent torque impulses of opposite sense, an inertia member capable of independent oscillation, means for selectively transferring torque impulses of one sense only to the inertia member, means for transferring torque from the inertia member to the driven member, said inertia member acting to determine the factor of torque multiplication automatically in accordance with the momentary conditions of load and speed, and means for manually controlling the transmission to transmit torque impulses of either sense to the inertia member.

12. In a continuously variable power transmission, the combination of a driving member, a driven member, a hydraulic clutch including a driving element and a driven element, said driven element including a clutch housing having considerable inertia, a resilient connection between the driven element of the clutch and the driven member, and means for oscillating the driving element of the clutch from the driving member.

13. In a continuously variable power transmission, the combination of a driving member, a driven member, a one-way clutch including a driving element having a relatively low inertia and a driven element having a relatively high inertia, a resilient connection between the driven element of the clutch and the driven member, and means for oscillating the driving element of the clutch from the driving member.

14. In an automatic continuously variable power transmission, the combination of a driving member, a driven member, a one-way clutch having driving and driven elements, means for oscillating the driving element of the clutch, a resilient connection between the driven element of the clutch and the driven member and control means for manually changing the direction of the one-way action of the clutch.

15. In an automatic continuously variable power transmission, the combination of a driving member, a driven member, a hydraulic one-way clutch having driving and driven elements, means for oscillating the driving element of the clutch, a resilient connection between the driven element of the clutch and the driven member and control means for manually changing the direction of the one-way action of the clutch.

16. In a continuously variable power transmission, the combination of a driving member, a driven member, energy storing means associated with the driving member, a clutch for alternately withdrawing and permitting storage of energy impulses in the energy storing means, and inertia means associated with the driven member for automatically controlling the torque at which energy impulses are withdrawn in accordance with varying conditions of load and speed.

17. In a continuously variable power transmission, the combination of a driving member, a driven member, energy storing means associated with the driving member, a clutch for alternately withdrawing and permitting storage of energy impulses in the energy storing means, and inertia means resiliently connected to the driven member for automatically controlling the torque at which energy impulses are withdrawn in accordance with varying conditions of load and speed.

18. In a continuously variable power transmission, the combination of a driving member, a driven member, energy storing means associated with the driving member, a clutch for alternately withdrawing and permitting storage of energy impulses in the energy storing means, and inertia means connected to the driven member so as to partake of the same total resultant rotation as the driven member for automatically controlling the torque at which energy impulses are withdrawn in accordance with varying conditions of load and speed.

19. In a continuously variable power transmission, the combination of a driving member, a driven member, energy storing means associated with the driving member, a clutch for alternately withdrawing and permitting storage of energy impulses in the energy storing means, and inertia means partaking solely of rotary movements about its own center of gravity for automatically controlling the torque at which energy impulses are withdrawn in accordance with varying conditions of load and speed.

20. In a continuously variable power transmission, the combination of a driving member, a driven member, energy storing means associated with the driving member, a clutch for alternately withdrawing and permitting storage of energy impulses in the energy storing means, and inertia means balanced with respect to its own axis of rotation for automatically controlling the torque at which energy impulses are withdrawn in accordance with varying conditions of load and speed.

21. In a continuously variable power transmission, the combination of a driving member, a driven member, energy storing means associated with the driving member, a clutch for alternately withdrawing and permitting storage of energy impulses in the energy storing means, and inertia means rotating on an axis concentric with the axis of the driven member for automatically controlling the torque at which energy impulses are withdrawn in accordance with varying conditions of load and speed.

22. In a continuously variable power transmission, the combination of a driving member, a driven member, energy storing means associated with the driving member, a one-way clutch for alternately withdrawing and permitting storage of energy impulses in the energy storing means, inertia means associated with the driven member for automatically controlling the torque at which energy impulses are withdrawn in accordance with varying conditions of load and speed, and control means for manually changing the direction of the one-way action of the clutch.

23. In a continuously variable power transmission, the combination of a driving member, a driven member, energy storing means associated with the driving member, a one-way clutch for alternately withdrawing and permitting storage of energy impulses in the energy storing means, inertia means resiliently connected to the driven member for automatically controlling the torque at which energy impulses are withdrawn in accordance with varying conditions of load and speed, and control means for manually changing the direction of the one-way action of the clutch.

24. In a continuously variable power transmission, the combination of a driving member, a driven member, energy storing means associated with the driving member, a one-way clutch for alternately withdrawing and permitting storage of energy impulses in the energy storing means, inertia means connected to the driven member so as to partake of the same total resultant rotation as the driven member for automatically controlling the torque at which energy impulses are withdrawn in accordance with varying conditions of load and speed, and control means for manually changing the direction of the one-way action of the clutch.

25. In a continuously variable power transmission, the combination of a driving member, a driven member, energy storing means associated with the driving member, a one-way clutch for alternately withdrawing and permitting storage of energy impulses in the energy storing means, inertia means partaking solely of rotary movements about its own center of gravity for automatically controlling the torque at which energy impulses are withdrawn in accordance with varying conditions of load and speed, and control means for manually changing the direction of the one-way action of the clutch.

26. In a continuously variable power transmission, the combination of a driving member, a driven member, energy storing means associated with the driving member, a one-way clutch for alternately withdrawing and permitting storage of energy impulses in the energy storing means, inertia means balanced with respect to its own axis of rotation for automatically controlling the torque at which energy impulses are withdrawn in accordance with varying conditions of load and speed, and control means for manually changing the direction of the one-way action of the clutch.

27. In a continuously variable power transmission, the combination of a driving member, a driven member, energy storing means associated with the driving member, a one-way clutch for alternately withdrawing and permitting storage of energy impulses in the energy storing means, inertia means rotating on an axis concentric with the axis of the driven member for automatically controlling the torque at which energy impulses are withdrawn in accordance with varying conditions of load and speed, and control means for manually changing the direction of the one-way action of the clutch.

28. In a continuously variable power transmission, the combination of a driving member, a driven member, energy storing means associated with the driving member, a one-way clutch for alternately withdrawing and permitting storage of energy impulses in the energy storing means, inertia means associated with the driven member for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

29. In a continuously variable power transmission, the combination of a driving member, a driven member, energy storing means associated with the driving member, a one-way clutch for alternately withdrawing and permitting storage of energy impulses in the energy storing means, inertia means resiliently connected to the driven member for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

30. In a continuously variable power transmission, the combination of a driving member, a driven member, energy storing means associated with the driving member, a one-way clutch for alternately withdrawing and permitting storage of energy impulses in the energy storing means, inertia means connected to the driven member so as to partake of the same total resultant rotation as the driven member for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

31. In a continuously variable power transmission, the combination of a driving member, a driven member, energy storing means associated with the driving member, a one-way clutch for alternately withdrawing and permitting storage of energy impulses in the energy storing means, inertia means partaking solely of rotary movements about its own center of gravity for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

32. In a continuously variable power transmission, the combination of a driving member, a driven member, energy storing means associated with the driving member, a one-way clutch for alternately withdrawing and permitting storage of energy impulses in the energy storing means, inertia means balanced with respect to its own axis of rotation for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

33. In a continuously variable power transmission, the combination of a driving member, a driven member, energy storing means associated with the driving member, a one-way clutch for alternately withdrawing and permitting storage of energy impulses in the energy storing means, inertia means rotating on an axis concentric with the axis of the driven member for automatically controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

34. In a continuously variable power transmission, the combination of a driving member, a driven member, energy storing means associated with the driving member, a clutch for alternately withdrawing and permitting storage of energy impulses in the energy storing means, inertia means associated with the driven member for automatically controlling the torque at which energy impulses are withdrawn in accordance with varying conditions of load and speed, and control means for manually varying the effective action of the clutch gradually from full release to full engaging action.

35. In a continuously variable power transmission, the combination of a driving member, a driven member, energy storing means associated with the driving member, a clutch for alternately withdrawing and permitting storage of energy impulses in the energy storing means, inertia means resiliently connected to the driven member for automatically controlling the torque at which energy impulses are withdrawn in accordance with varying conditions of load and speed, and control means for manually varying the effective action of the clutch gradually from full release to full engaging action.

36. In a continuously variable power transmission, the combination of a driving member, a driven member, energy storing means associated with the driving member, a clutch for alternately withdrawing and permitting storage of energy impulses in the energy storing means, inertia means connected to the driven member so as to partake of the same total resultant rotation as the driven member for automatically controlling the torque at which energy impulses are withdrawn in accordance with varying conditions of load and speed, and control means for manually varying the effective action of the clutch gradually from full release to full engaging action.

37. In a continuously variable power transmission, the combination of a driving member, a driven member, energy storing means associated with the driving member, a clutch for alternately withdrawing and permitting storage of energy impulses in the energy storing means, inertia means partaking solely of rotary movements about its own center of gravity for automatically controlling the torque at which energy impulses are withdrawn in accordance with varying conditions of load and speed, and control means for manually varying the effective action of the clutch gradually from full release to full engaging action.

38. In a continuously variable power transmission, the combination of a driving member, a driven member, energy storing means associated with the driving member, a clutch for alternately withdrawing and permitting storage of energy impulses in the energy storing means, inertia means balanced with respect to its own axis of rotation for automatically controlling the torque at which energy impulses are withdrawn in accordance with varying conditions of load and speed, and control means for manually varying the effective action of the clutch gradually from full release to full engaging action.

39. In a continuously variable power transmission, the combination of a driving member, a driven member, energy storing means associated with the driving member, a clutch for alternately withdrawing and permitting storage of energy impulses in the energy storing means, inertia means rotating on an axis concentric with the axis of the driven member for automatically controlling the torque at which energy impulses are withdrawn in accordance with varying conditions of load and speed, and control means for manually varying the effective action of the clutch gradually from full release to full engaging action.

40. In a continuously variable power transmission the combination of a driving member, a driven member, energy storing means associated with the driving member, a clutch for alternately withdrawing and permitting storage of energy impulses in the energy storing means, means for automatically controlling the torque at which energy impulses are withdrawn in accordance with varying conditions of load and speed, and means for independently varying the ratio of transmission from the driving member to the driven member at any condition of load and speed.

41. In a continuously variable power transmission, the combination of a driving member, a driven member, energy storing means associated with the driving member, a clutch for alternately withdrawing and permitting storage of energy impulses in the energy storing means, means for automatically controlling the torque at which energy impulses are withdrawn in accordance with varying conditions of load and speed, and a lever arm of adjustable length forming part of the power transmitting mechanism intermediate the driving member and driven member.

42. In a continuously variable power transmission, the combination of a driving member, a driven member, energy storing means associated with the driving member, a hydraulic clutch for alternately withdrawing and permitting storage of energy impulses in the energy storing means, means for automatically controlling the torque at which energy impulses are withdrawn in accordance with varying conditions of load and speed, and control means for causing the hydraulic clutch to act as a fluid brake when the driven member overruns the driving member.

43. In a continuously variable power transmission, the combination of a driving member, a driven member, energy storing means associated with the driving member, a hydraulic one-way clutch for alternately withdrawing and permitting storage of energy impulses in the energy storing means, means for automatically controlling the torque at which energy impulses are withdrawn in accordance with varying conditions of load and speed, and control means for causing the hydraulic clutch to act as a fluid brake when the driven member overruns the driving member.

44. In a continuously variable power transmission, the combination of a driving member, a driven member, energy storing means associated with the driving member, a one-way clutch for alternately withdrawing and permitting storage of energy impulses in the energy storing means, means for controlling the torque at which energy impulses are withdrawn in accordance with varying conditions of load and speed, and control means for manually changing the direction of the one-way action of the clutch gradually from full action in one direction through a condition of full release in both directions to full action in the opposite direction.

45. In a continuously variable power transmission, the combination of a driving member, a driven member, energy storing means associated with the driving member, a one-way clutch for alternately withdrawing and permitting storage of energy impulses in the energy storing means, means for controlling the torque at which energy impulses are withdrawn in accordance with varying conditions of load and speed, and control means for manually varying the effective action of the clutch gradually from full release to full engaging action.

46. A device for producing mechanical power at various torques and speeds comprising in combination a motor, a continuously variable power transmission including a driving member, a driven member, energy storing means associated with the driving member, a one-way clutch for alternately withdrawing and permitting storage of energy impulses in the energy storing means, means for controlling the torque at which energy impulses are withdrawn in accordance with varying conditions of load and speed, control means for manually changing the direction of the one-way action of the clutch gradually from full action in one direction through a condition of full release in both directions to full action in the opposite direction, and a single manually operable control for operating the control means and also controlling the motor.

47. A device for producing mechanical power at various torques and speeds comprising in combination a motor, a continuously variable power transmission including a driving member, a driven member, energy storing means associated with the driving member, a one-way clutch for alternately withdrawing and permitting storage of energy impulses in the energy storing means, means for controlling the torque at which energy impulses are withdrawn in accordance with varying conditions of load and speed, control means for manually varying the effective action of the clutch gradually from full release to full engaging action, and a single manually operable control for operating the control means and also controlling the motor.

48. A device for producing mechanical power at various torques and speeds comprising in combination a motor, a continuously variable power transmission including a driving member, a driven member, energy storing means associated with the driving member, a hydraulic clutch for alternately withdrawing and permitting storage of energy impulses in the energy storing means, means for automatically controlling the torque at which energy impulses are withdrawn in accordance with varying conditions of load and speed, control means for causing the hydraulic clutch to act as a fluid brake when the driven member overruns the driving member, and a single manually operable control for operating the control means and also controlling the motor.

49. A device for producing mechanical power at various torques and speeds comprising in combination a motor, a continuously variable power transmission including a driving member, a driven member, energy storing means associated with the driving member, a hydraulic one-way clutch for alternately withdrawing and permitting storage of energy impulses in the energy storing means, means for automatically controlling the torque at which energy impulses are withdrawn in accordance with varying conditions of load and speed, control means for causing the hydraulic clutch to act as a fluid brake when the driven member overruns the driving member, and a single manually operable control for operating the control means and also controlling the motor.

50. In a motor vehicle, the combination of a motor, a pair of traction wheels having their axes perpendicular to the motor axis, a continuously variable transmission comprising mechanism substantially on the axis of the traction wheels, and a swash plate substantially on the axis of the motor for transmitting oscillatory movement to said mechanism whereby power is transmitted from the engine to the wheels without the interposition of gearing.

51. In a motor vehicle, the combination of a motor having an output shaft, a traction wheel driving shaft having its axis perpendicular to that of the motor output shaft, swash plate mechanism located at the intersection of the two shaft axes for converting the rotary motion of the motor output shaft into oscillatory motion, and a one-way clutch for converting the oscillatory motion into unidirectional rotation of the wheel driving shaft.

52. In a motor vehicle, a frame, a wheel bearing resiliently connected to the frame, a stub axle rotatably mounted in said bearing, power transmitting means mounted on the frame and having an output shaft, and a shaft member comprising a flexible resilient rubber-like material connecting the output shaft and the stub axle for the transmission of power therebetween while permitting relative motion between said bearing and the frame.

53. In a motor vehicle, a frame, a wheel bearing resiliently connected to the frame, a stub axle rotatably mounted in said bearing, power transmitting means mounted on the frame and having an output shaft disposed in substantially the same vertical plane as the stub axle, and a shaft member comprising a flexible resilient rubber-like material connecting the output shaft and the stub axle for the transmission of power therebetween while permitting relative motion between said bearing and the frame.

54. In a continuously variable power transmission, the combination of a driving member, a driven member, energy storing means associated with the driving member, a clutch for alternately withdrawing and permitting storage of energy impulses in the energy storing means, means for automatically controlling the torque at which energy impulses are withdrawn in accordance with varying conditions of load and speed, and control means for causing the clutch to act as a brake when the driven member overruns the driving member.

55. In a continuously variable power transmission, the combination of a driving member, a driven member, energy storing means associated with the driving member, a one-way clutch for alternately withdrawing and permitting storage of energy impulses in the energy storing means, means for automatically controlling the torque at which energy impulses are withdrawn in accordance with varying conditions of load and speed, and control means for causing the clutch to act as a brake when the driven member overruns the driving member.

56. A device for producing mechanical power at various torques and speeds comprising in combination a motor, a continuously variable power transmission including a driving member, a driven member, energy storing means associated with the driving member, a clutch for alternately withdrawing and permitting storage of energy impulses in the energy storing means, means for automatically controlling the torque at which energy impulses are withdrawn in accordance with varying conditions of load and speed, control means for causing the clutch to act as a brake when the driven member overruns the driving member, and a single manually operable control for operating the control means and also controlling the motor.

57. A device for producing mechanical power at various torques and speeds comprising in combination a motor, a continuously variable power transmission including a driving member, a driven member, energy storing means associated with the driving member, a one-way clutch for alternately withdrawing and permitting storage of energy impulses in the energy storing means, means for automatically controlling the torque at which energy impulses are withdrawn in accordance with varying conditions of load and speed, control means for causing the clutch to act as a brake when the driven member overruns the driving member, and a single manually operable control for operating the control means and also controlling the motor.

58. In a motor vehicle having a motor and a continuously variable power transmission and including means capable of producing a braking effect varying with the speed of the motor vehicle, the combination of a control member normally biased to a position of rest and movable therefrom through a first intermediate position and a second intermediate position to an ultimate position, and connections between the control member and the motor and said transmission, and means whereby said means may be controlled to produce a braking torque when the control member is in a position of rest which varies with the speed of the vehicle and operable to reduce the braking torque to zero while moving to the first intermediate position and to permit free wheeling in that position and also operable to condition the transmission for transmitting power at automatically varied factors of torque multiplication upon movement to the second intermediate position and operable to vary the power output of the motor by movement of the control member between the second intermediate position and the ultimate position.

59. In a motor vehicle having a motor and a continuously variable power transmission and including means capable of producing a braking effect varying with the speed of the motor vehicle, the combination of a control member normally biased to a position of rest and movable therefrom through a first intermediate position and a second intermediate position to an ultimate position, and connections between the control member and the motor and said transmission, and means whereby said means may be controlled to produce a braking torque when the control member is in a position of rest which varies with the speed of the vehicle and operable to reduce the braking torque to zero while moving to the first intermediate position and to permit free wheeling in that position and also operable to condition the transmission for transmitting power at automatically varied factors of torque multiplication upon movement to the second intermediate position and operable to vary the power output of the motor by movement of the control member between the second intermediate position and the ultimate position, and a second control member for reversing the direction of motion of the vehicle.

60. In a motor vehicle having a motor and a continuously variable power transmission and including means capable of producing a braking effect varying with the speed of the motor vehicle, the combination of a control member normally biased to a position of rest and movable therefrom through a first intermediate position and a second intermediate position to an ultimate position, and connections between the control member and the motor and said transmission, and means whereby said means may be controlled to produce a braking torque when the control member is in a position of rest which varies with the speed of the vehicle and operable to reduce the braking torque to zero while moving to the first intermediate position and to permit free wheeling in that position and also operable to condition the transmission for transmitting power at automatically varied factors of torque multiplication upon movement to the second intermediate position and operable to vary the power output of the motor by movement of the control member between the second intermediate position and the ultimate position and a second control member movable between three positions, in the first of which the transmission will be conditioned for forward movement of the vehicle and in the second of which the transmission will be conditioned for free wheeling, and in the third of which the transmission will be conditioned for reverse movement of the vehicle.

61. In a motor vehicle the combination of a motor having a rotary power output shaft, a pair of independently suspended traction wheels mounted for generally coaxial rotation, eccentric means including a journal associated with the motor output shaft for simultaneous rotation therewith, a power transmission mechanism intermediate the traction wheels and having an oscillatable shaft journaled on an axis approximately on the axis of the traction wheels, a journal associated with said shaft and spaced from its axis of rotation, a rigid connecting member having a bearing surrounding each of said journals and adapted to transform the rotation of the power output shaft into oscillation of the oscillatable shaft, and a pair of rotary flexible shafts connecting said transmission with each traction wheel.

62. In a motor vehicle the combination of a motor having a rotary power output shaft, a pair of independently suspended traction wheels mounted for generally coaxial rotation, eccentric means including a journal associated with the motor output shaft for simultaneous rotation therewith, a power transmission mechanism intermediate the traction wheels and having an oscillatable shaft, a journal associated with said shaft and spaced from its axis of rotation, a rigid connecting member having a bearing surrounding each of said journals and adapted to transform the rotation of the power output shaft into oscillation of the oscillatable shaft, and a pair of rotary flexible shafts connecting said transmission with each traction wheel.

63. In a motor vehicle, a frame, a wheel bearing resiliently secured to the frame, a stub axle rotating in said bearing, an automatic continuously variable power transmission mounted on the frame substantially on the axis of the wheel bearing, and a shaft flexible throughout substantially its entire length and torsionally resilient connecting said transmission and the stub axle, said shaft acting both to maintain driving connection during displacement of the stub axle relative to said transmission and to cooperate with said transmission in automatically varying the effective drive ratio.

64. In a continuously variable power transmission, the combination of a driving member, a driven member, energy storing means associated with the driving member, and mechanism intermediate the driving and driven member for alternately withdrawing and permitting storage of energy impulses in the energy storing means, said mechanism including means for intermittently trapping a body of fluid in a static condition to form a non-yielding torque transmitting medium, and means for varying the torque at which impulses are withdrawn.

65. In a continuously variable power transmission, the combination of a driving member, a driven member, an intermediate inertia member, and a resilient connection between the intermediate member and the driven member, means operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied.

66. In a continuously variable power transmission, the combination of a driving member, a driven member, an intermediate inertia member, and a resilient connection between the intermediate member and the driven member, means operated by the driving member for alternately accelerating the inertia member ahead of the driven member thereby stressing the resilient connection and releasing all connection between the driving member and the inertia member thereby permitting it to decelerate and move back under the influence of the stressed resilient connection, the inertia of the intermediate member and the stress-displacement characteristic of the resilient connection being so correlated as to automatically adjust the torque of the driven shaft at any speed thereof to substantially the maximum possible for any power input to the driving member whereby the effective drive ratio may be automatically varied.

67. In a continuously variable power transmission, the combination of a driving member, a driven member, an intermediate inertia member, and a resilient connection between the intermediate member and the driven member, means including a one-way clutch having an oscillating driving member operated by the driving member for alternately accelerating the inertia member ahead of the driven member thereby stressing the resilient connection and releasing all connection between the driving member and the inertia member thereby permitting it to decelerate and move back under the influence of the stressed resilient connection, whereby the effective drive ratio may be automatically varied.

68. In a continuously variable power transmission, the combination of a driving member, a driven member, an intermediate inertia member, and a resilient connection between the intermediate member and the driven member, oscillating means operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied.

69. In a continuously variable power transmission, the combination of a driving member, a driven member, an intermediate inertia member, and a resilient connection between the intermediate member and the driven member, means including a one-way clutch having an oscillating driving member operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied, and control means for manually changing the direction of the one-way action of the clutch.

70. In a continuously variable power transmission, the combination of a driving member, a driven member, an intermediate inertia member, and a resilient connection between the intermediate member and the driven member, means including a one-way clutch having an oscillating driving member operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied, and control means for manually changing the direction of the one-way action of the clutch gradually from full action in one direction to 71. In a continuously variable power transmission, the combination of a driving member, a driven member, an intermediate inertia member, and a resilient connection between the intermediate member and the driven member, means including a one-way clutch having an oscillating driving member operated by the driving member for alternately accelerating the inertia member ahead of the driven member thereby stressing the resilient connection and releasing all connection between the driving member and the inertia member thereby permitting it to decelerate and move back under the influence of the stressed resilient connection, whereby the effective drive ratio may be automatically varied, and control means for manually varying the effective action of the clutch gradually from full release to full engaging action.

72. In a continuously variable power transmission, the combination of a driving member, a driven member, an intermediate inertia member, and a resilient connection between the intermediate member and the driven member, a hydraulic one-way clutch having an oscillating driving member, means operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied, and means for causing the hydraulic clutch to act as a fluid brake when the driven member overruns the driving member.

73. In a continuously variable power transmission, the combination of a driving member, a driven member, an intermediate inertia member, and a resilient connection between the intermediate member and the driven member, means operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied, said last named means including a fluid pressure energy translating device.

74. In a continuously variable power transmission, the combination of a driving member, a driven member, an intermediate inertia member, and a resilient connection between the intermediate member and the driven member, means operated by the driving member for alternately accelerating the inertia member ahead of the driven member thereby stressing the resilient connection and releasing all connection between the driving member and the inertia member thereby permitting it to decelerate and move back under the influence of the stressed resilient connection whereby the effective drive ratio may be automatically varied, said last named means including a one-way, fluid pressure operated, driving connection.

75. In a variable speed power transmission device the combination of a driving member, a driven member, means for transmitting power between the driving and driven members at varying ratios of torque and speed, said means including means for delivering power in a succession of rapid intermittent torque impulses and a torsionally resilient shaft section of a length several times its transverse dimension and comprising a body of flexible, resilient rubber-like material, adapted to take up the resulting irregularities in angular velocity between the last named means and the driven member.

CHARLES J. ANDERSON, Jr.